Oct. 25, 1960     J. P. HEISS     2,957,702
FLUID PRESSURE SELF-LEVELING ASSEMBLY FOR VEHICLE SUSPENSIONS
Filed Sept. 13, 1955     4 Sheets-Sheet 1

Inventor
John P. Heiss

Oct. 25, 1960 J. P. HEISS 2,957,702
FLUID PRESSURE SELF-LEVELING ASSEMBLY FOR VEHICLE SUSPENSIONS
Filed Sept. 13, 1955 4 Sheets-Sheet 3

Inventor
John P. Heiss

United States Patent Office 2,957,702
Patented Oct. 25, 1960

2,957,702

FLUID PRESSURE SELF-LEVELING ASSEMBLY FOR VEHICLE SUSPENSIONS

John P. Heiss, Flint, Mich., assignor to Thompson Ramo Wooldridge Inc., a corporation of Ohio Filed Sept. 13, 1955, Ser. No. 534,121

22 Claims. (Cl. 280—124)

The present invention relates to automatic leveling systems for road vehicles and is, more particularly, concerned with the provision of a novel and substantially improved hydraulic-pneumatic system for maintaining a road vehicle at a predetermined attitude.

I am, of course, aware that numerous attempts have been made in the prior art to provide a completely automatic vehicle suspension in which the level of the vehicle body is maintained at a substantially constant value, above the supporting road surface, independently of the load placed in the vehicle. I am also aware of the attempts made in the prior art to eliminate mechanical spring suspension of road vehicles and substitute pneumatic cushions for them. However, to my knowledge, no completely practicable, and at the same time substantially foolproof, system has been devised prior to the present invention, for combining automatic leveling and pneumatic suspension in a simple manner. In accordance with the present invention, a substantially improved and simplified system is provided in which the automotive vehicle body is maintained at a predetermined level or attitude and at the same time is provided with highly desirable low-rate pneumatic spring suspension means under the control of effective, yet extremely simple, shock absorption apparatus.

In accordance with the principles of the present invention, a hydraulic, collapsible, strut is provided between the vehicle body and the housing of each individual wheel axle. This strut is provided with a fluid chamber into which hydraulic fluid under substantial pressure is bled. At the same time, fluid is drained from the chamber to a second chamber having a pneumatically supported resilient wall. Accordingly, upon collapse or compression of the strut chamber, hydraulic fluid flows into the second or pneumatic spring chamber, forcing the resilient wall thereof outwardly against pneumatic pressure. Upon release of the load causing compression of the strut chamber, the pneumatic pressure urges the fluid from the second chamber back into the strut chamber in a resilient manner thereby providing what may be termed an "air spring." The flow of fluid from the strut chamber to the air spring chamber is damped by means of a double acting shock absorber valve, thereby preventing continued oscillation of the system.

In order to provide constant leveling in a simple manner, a novel continuous flow recirculating system is provided. Thus, in accordance with the principles of the present invention, fluid under high pressure is introduced through a metering valve to the strut chamber and is bled from the air spring chamber through a metering valve to the pressure source, which is preferably a conventional high pressure hydraulic pump. As a result of the continuous flow thus established, any slight impurities introduced into the system, such as occasionally happens in service stations, will not clog the valves and will be flushed back to the pump reservoir where it may be removed by filtration. Further, in view of the continuous flow operation of the system the present leveling apparatus is fully effective in cold weather since the engine heat may readily be applied to the circulating fluid at or adjacent the pump. Likewise, in extremely hot weather an intercooler may be provided, if desired, for cooling the fluid to maintain a desired, calibrated, spring condition.

It is, accordingly, an object of the present invention to provide automatic continuous flow leveling system for vehicles.

Another object of the present invention is to provide a simplified automatic leveling system having accurate shock absorbing characteristics based on the control of moving hydraulic fluid while at the same time providing pneumatic vehicle suspension.

Still a further object of the present invention is to provide an improved hydraulic-pneumatic vehicle suspension system.

A feature of the invention resides in the provision of an expansible-contractable hydraulic strut under the control of a vehicle body-position controlled metering valve.

Another feature of the invention resides in the provision of a series of fluid flow controlling metering orifices adapted to control the operation of a hydraulic strut and a pneumatic spring combination.

Still another object of the present invention is to provide an inexpensive vehicle suspension system providing automatic leveling, shock absorbing, and spring functions at a minimum cost.

Another object of the present invention is to provide a collapsible hydraulic strut having vehicle body position responsive means for metering hydraulic fluid into the strut to prevent collapse thereof and means of permitting a continuous flow of fluid through said valve.

Yet a further object of the present invention is to provide an automatically leveling vehicle suspension incorporating an extreme low spring rate.

Still other and further objects and features of the present invention will at once become apparent to those skilled in the art from a consideration of the attached drawings wherein.

As shown on the drawings.

Figure 1:
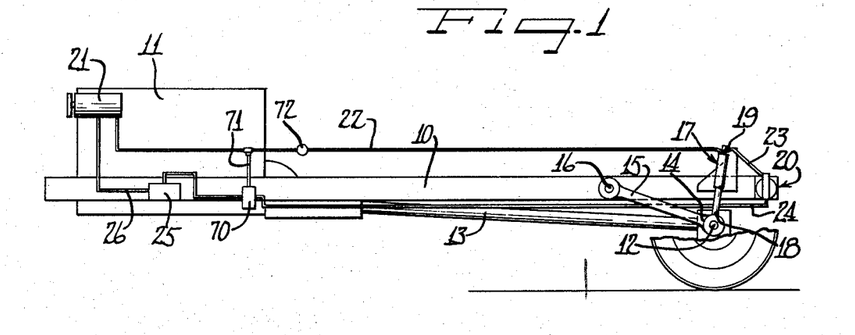
Figure 1 is a schematic view of a preferred form of leveling system constructed in accordance with the present invention.

As may be seen from a consideration of Figure 1, the system of the present invention is adapted for use with a vehicle having a rigid frame portion 10 carrying conventional engine means 11 drivingly connected to rear axle 12 by means of a conventional drive shaft 13. The rear axle 12 is rotatably supported in a housing 14 rigidly secured to the suspension arm 15 which is in turn pivoted to the frame 10 at 16. An hydraulic leveling strut generally indicated at 17 is pivotally secured to the housing 14 as at 18 and to the frame member 10 as at 19.

In accordance with the principles of the present invention, the entire weight of the vehicle, with the exceptions of the unsprung weight, is supported by the leveling strut 17 and the associated parts which comprise an air spring generally indicated at 20 and a high pressure hydraulic pump 21. As may be seen, high pressure hydraulic fluid is directed from the pump 21 to the strut 17 via a conduit 22 and hydraulic fluid leaves the strut 17 and enters the air spring 20 via intermediate conduit 23. Hydraulic fluid at substantially atmospheric pressure leaves the air spring 20 via conduit 24, is collected in a reservoir 25 and is subsequently repressurized in the pump 21 via the pump inlet conduit 26. The pump 21 may be of any conventional form and is preferably driven by means of the conventional engine fan belt. It will be understood, however, that any source of high pressure fluid may be utilized in the leveling system of the present invention.

Figure 2:
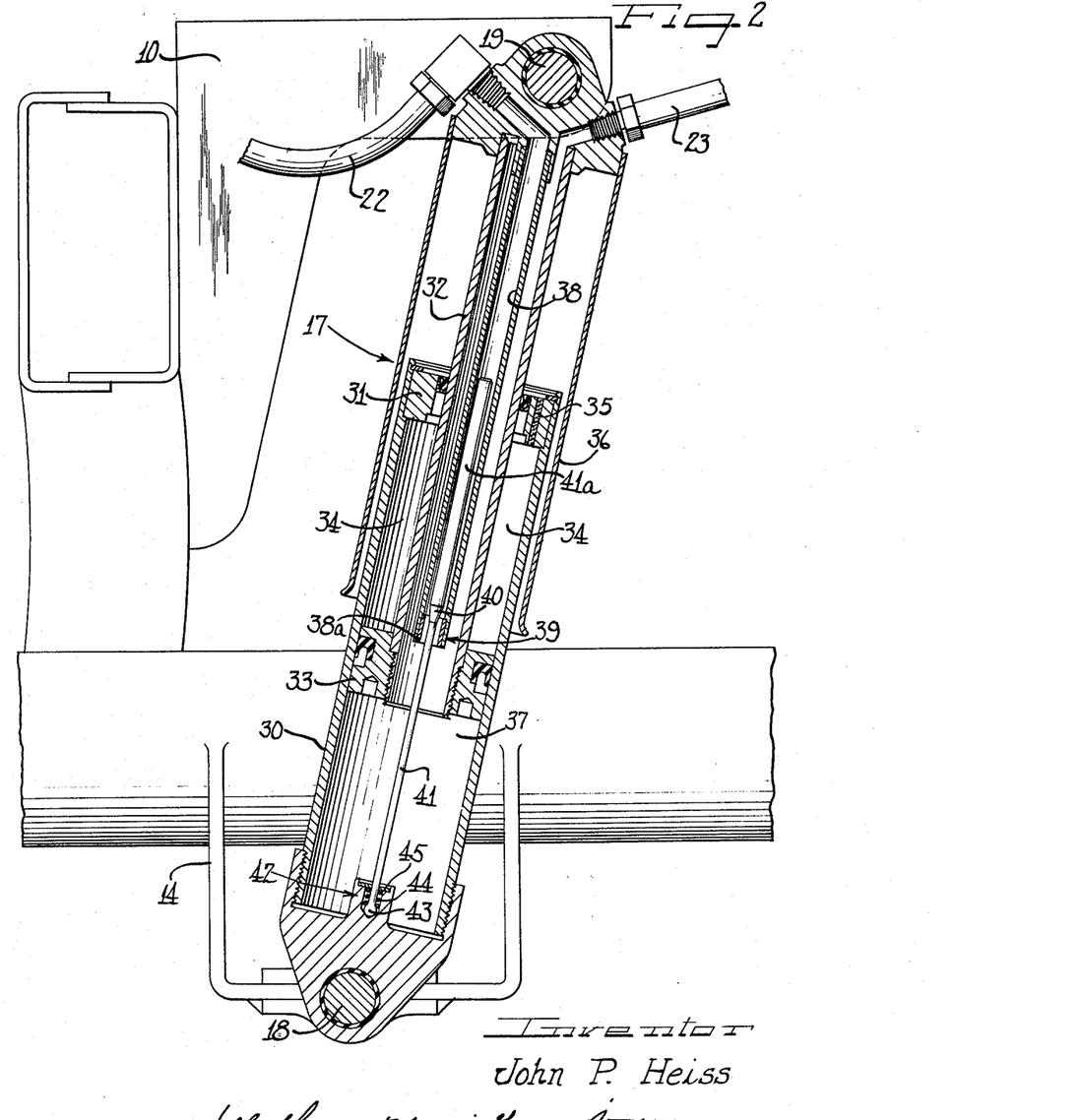
Figure 2 is an enlarged cross sectional view, in elevation, of an automatically leveling strut constructed in accordance with the present invention.
Figure 3:
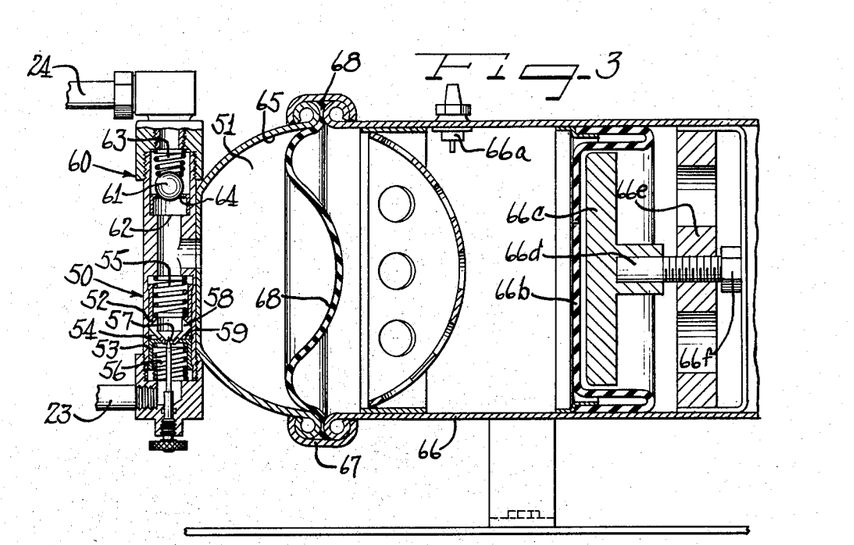
Figure 3 is an elevational view in cross section of a pneumatic spring constructed in accordance with the present invention for cooperation with the strut shown in Figure 2.

The details of the leveling apparatus of the present invention may be seen from a consideration of the enlarged views of Figures 2 and 3. As is there shown, the hydraulic leveling strut 17 comprises a first tubular housing member 30 pivotally secured as at 18, to the axle housing 14. The tubular strut housing 30 carries at its upper end a guide bearing 31 reciprocably supporting a tubular rod 32 which is pivotally secured as at 19 to the vehicle frame 10. At the lower end of the rod 32, a piston 33 is rigidly secured for reciprocation within the housing 30. As may be seen, the area within the tubular rod 32 and the lower part of the housing 30 comprises a hydraulic chamber, the volume of which varies as the tubular rod 32 reciprocates. Air in the upper chamber 34 is vented through the guide 31 via a porous filter element 35 and flows to atmosphere through the annular space between the cylindrical dust shield 36 and the outer wall of the housing 30.

Hydraulic fluid is directed into the chamber 37 from the pump 21 through conduit 22, tubular valve housing 38 and metering valve 39. The metering valve 39 comprises a generally cylindrical valve seat 38a fixedly carried by the valve housing 38 and a tapered valve core 40 carried by the valve stem 41 secured for movement with a pivot point 18, as at 42. In order to provide sufficient freedom of movement for the valve stem 41 to prevent binding, a universal pivot is provided therefor by the enlarged ball portion 43 which cooperates with a spring 44 maintained in position by a retainer clip 45. This connection also permits a slight over travel in the direction of elongation of the strut 17 without damaging the valve 39.

Assuming, for purposes of description, that no fluid were permitted to leave the chamber 37, fluid entering the valve housing 38 would pass through the valve 39 into the chamber 37 and would force the piston 33 upwardly until the valve seat 38a, carried by the piston 33 cooperated with the tapered valve portion 40 to limit further flow to a predetermined design valve. This would, of course, occur at a predetermined design strut length and if the fluid were to be slowly leaked from the chamber 37, fluid entering through conduit 22 would operate to maintain the strut at the predetermined length.

In accordance with the present invention, fluid is permitted to flow from the chamber 37 continuously through a shock control valve 50 and, further, during the application of road forces, such as resulting from the bumps and the like, fluid is permitted to pass from the chamber 37, through the conduit 23, and a shock control valve 50 into an air spring chamber 51. The manner in which this is effected may be seen from a consideration of Figure 3.

As shown in Figure 3, the shock control valve comprises an impact plunger 52 and a rebound plunger 53 biased toward a central abutment 54 by respective springs 55 and 56. The impact plunger 52 is provided with a central metering orifice 57 and a plurality of bypass orifices 58. The bypass orifices 58 are normally blocked off by the radially inturned flange 59 on the rebound plunger 53 such that in the quiet condition, in which no load variations are being imposed on the system, flow through the shock control valve is limited to the orifice 57.

Hydraulic fluid passing through the orifice 57 in the steady state condition, or condition in which load variations are occurring, returns to the sump or reservoir at 25 via conduit 24 through a system relief and metering valve 60. This valve comprises a ball 61 seated in a generally circularly apertured seat 62 and held thereagainst by means of spring 63. The seat 62 is provided with an open notch 64 through which fluid may flow at all times. During surge conditions, the ball 61 may be unseated and, additionally, should the small notch 64 become clogged, excessive pressure in the system will unseat the ball 62 to permit the notch to be flushed free of the clogging material. In effect, the notch 64 therefore operates as a self flushing metering orifice.

The air spring chamber 51 comprises a housing 65 secured to an air chamber 66 by means of a clamping ring 67 which simultaneously operates to maintain the two housing portions 65 and 66 together and to secure an impervious diaphragm 68 between the hydraulic fluid in the chamber 51 and the air spring. While the chamber is here termed an air spring, it will be understood that substantially any gas under pressure is satisfactory. For example, high pressure nitrogen has been found to be ideal.

Over-all control is accomplished by providing a relationship between the maximum and minimum flow conditions of the valve 39 and the metering orifice 64. In accordance with the principles of the present invention, the valve 39 is constructed to provide a maximum opening which is somewhat greater than the opening provided at the orifice 64 and a minimum opening which is somewhat less than the opening provided at orifice 64. The orifice 57 in the shock control valve is slightly larger than the maximum opening condition of the valve 39 and, accordingly, the shock control valve will not affect the operation of the system when the vehicle is standing or is in operation on a smooth road surface, such as a boulevard or the like. The orifice 57 may readily be controlled by means of the adjustable needle 57a to provide a desired damping characteristic for shock conditions existing as a result of unusually rough road conditions.

In operation, with the valves constructed in accordance with the relationship above described, fluid under pressure is introduced into the chamber 37 via the conduit 22, tubular housing 38, and valve 39. If the strut 17 is collapsed somewhat, as a result of an increase in the vehicle load, or for any other reason, the valve stem 41 will have moved upwardly relative to the seat 38a so that the valve 39 will be in its full-open condition. As above explained, the full-open condition of the valve 39 provides an opening substantially larger than the opening 64 at the metering valve 60. As a result, fluid under pressure accumulates in the chamber 37, forcing the piston 33 upwardly and finally positioning the valve parts 40 and 38a in a position in which the flow permitted to pass therethrough is substantially equal to the flow passed by the metering valve 60. It will be realized that the position of the valve 39 will provide a steady state condition in which fluid is continually circulating from the pump 21 through the strut 17, valve 60 and back to the reservoir 25.

In view of the provision of the constantly open metering valve 60 and the resulting need for a continuous flow of fluid under pressure into the chamber 37 in order to maintain the strut in its predetermined condition of length in which the vehicle may be termed "at attitude," overextension of the strut 17, except for extremely short periods of vibration, is prevented. This is true since extension of the strut beyond the condition in which the large diameter portion 41a of the valve stem 41 passes into and through the valve seat 38a will provide a minimum flow of make up fluid. This flow is, as above noted, less than the flow of fluid through the metering valve 60 and accordingly fluid will be leaked from the chamber 37 at a greater rate than it will be introduced therein. As a result, the strut 17 will quickly contract to a position in which the valve 39 again opens to an extent sufficient to supply as much fluid under pressure to the chamber 37 as is constantly drained therefrom through the valve 60.

Under ordinary boulevard ride conditions in which the road is presumably smooth and with only minor undulations, extension and contraction of the strut 17 occur at a relatively slow rate and cause displacement of the fluid back and forth through the aperture 57 into the chamber 51 of the air spring. The compressed air, or other gas, which may comprise an inert gas such as nitrogen for safety's sake, supplies a resilient force tending to resist instantaneous contraction of the strut 17. In this situation the orifice 57 operates to provide a slight restriction to the fluid flow and accordingly introduces a small damping force which is entirely adequate for the usual boulevard ride conditions.

When the vehicle is driven over rough roads or over any form of instantaneous obstacle which attempts to collapse the strut 17 abruptly the orifice 57 provides a substantial impediment to the flow of fluid from the chamber 37 into the air spring chamber 51. When this impediment reaches a predetermined value the impact spring 55 is compressed unseating the plunger 52 and permitting the fluid to flow through the large openings 58 into the air spring chamber 51. The spring 55 is calibrated to permit opening of the ports 58 rather readily in order to permit a soft ride. On the rebound stroke, however, the plunger 52 moves downwardly and again closes off the port 58 by contact with the radial flange 59 on the rebound plunger 53. The fluid passing freely through ports 58 builds up a pressure against the radial flange 59 and upon the attainment of a predetermined rebound pressure the spring 56 will yield to permit the flange 59 to pull away from the plunger 52 thereby permitting flow of the fluid back from the chamber 51 to chamber 37. The rebound spring 56 is ordinarily constructed to permit opening of the rebound fluid passageway at a substantially higher pressure than is sufficient to open the ports 58 on the impact stroke. As a result, the strut 17 re-extends at a substantially slower rate, in the preferred vehicle construction, than it contracts. It will also, of course, be realized that during the period of contraction and rebound fluid under pressure will be directed into the chamber 37, through the valve 39 also tending to re-extend the strut 17. This additional force causing re-extension is, however, a smaller one than that of the oil returning from the chamber 51, since, as above discussed, the orifice 57 is constructed to be larger than the maximum full open position of the valve 39. Of course, in the extreme situation in which the rebound plunger 53 unseats to permit fluid flow through the ports 58, the relative effect of the introduction of pressurized fluid through the valve 34 is even more limited.

On rare occasions, the orifice 64 may become clogged with material carried by the circulating hydraulic fluid. Such a condition would, of course, cause the strut 17 to extend since even the minimum diameter of the valve 39 would permit pressure to build up in the chamber 37. The spring 63 provides a relief valve for the system to prevent the accumulation of excessive pressure to the chamber 37 and is of a strength designed to permit opening of the valve 60 in such extreme conditions. Upon opening of the valve 60, the orifice which is in part defined by the ball 61 is flushed and upon such flushing will serve to provide its normal leak down, thereby permitting the strut 17 to assume its normal position. This self flushing action of the valve 60 prevents any possibility of an improper, continuous, extension of the strut 17 which would cause the vehicle to assume a tilted condition.

At the same time, the valve 60 provides an emergency blow off relief for the hydraulic system should the condition arise in which the air spring is unable to accommodate the flow of hydraulic fluid.

It will, of course, be obvious to those skilled in the art that in a recirculating, continuous flow system of the type hereinabove set forth, the strut 17 will collapse as a result of the continuous leak down through the orifices 57 and 64, when the pump 21 ceases to operate. In order to prevent this from occurring while the vehicle is parked or otherwise inoperative, a lock out or holding valve 70 may be provided in the return conduit 24. This valve prevents hydraulic fluid from passing through the conduit 24 and accordingly maintains load-carrying pressure in the chamber 37 independently of operation of the pump. It is preferred that the valve be responsive to a vehicle-operating condition whereby the valve will open as soon as the vehicle is placed in an operative condition. One such arrangement is to direct the out pressure of the pump 21 to valve 70 by means of a bleed conduit 71 to actuate the valve 70 into the open position only when a positive pressure is applied to the conduit 22 by the pump. A check valve 72 may be provided in the conduit 22 down stream of the bleed conduit 71 to prevent a build up of pressure in the bleed conduit as a result of reverse flow from the chamber 37 back through the valve 39 when the vehicle is parked. It will be understood that the conduit 71 may if desired, receive fluid under pressure from any convenient source responsive to vehicle operation instead of applying the leveling pump pressure thereto. For example oil from the conventional engine lubricating pump may be used.

Figure 4:
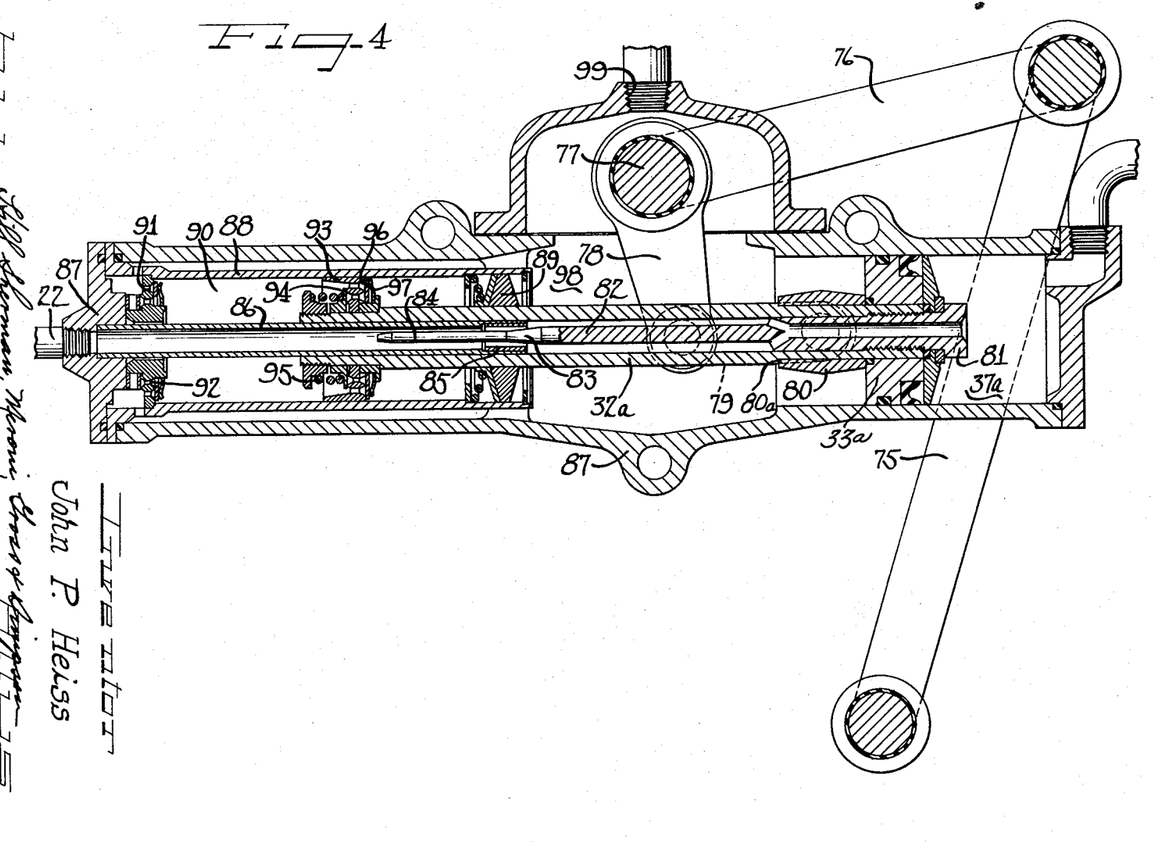
Figure 4 is a cross sectional view, in elevation, of a modified form of hydraulic strut constructed in accordance with the present invention and, Figure 5 is still a further modified form of hydraulic strut adapted for use in accordance with the principles of the present invention.

A modified form of the continuous flow vehicle leveling strut system is illustrated in Figure 4. As may there be seen, the axle housing bracket 14 is directly linked by means of a rigid link 75 to a lever arm 76 which is in turn rigidly secured to a shaft 77. The shaft 77 carries a second arm 78, of forked construction which straddles a piston-carrying tubular housing 32a. A pair of links 79 are disposed on opposite sides of the tube 32a for pivotal connection with the yoke 80 carried by the tube 32a and rigidly secured thereto by means of abutment 80a and the piston 33a rigidly secured to the tube 32a by means of a valve stem securing member 81.

The valve stem 82 having a tapered valve orifice defining portion 83 and a reduced diameter orifice-limiting portion 84 is thus rigidly secured for movement with the arm 78 and, accordingly, with the axle member 14.

The portions 82, 83 and 84 cooperate with a valve orifice or seat member 85 to define a leveling valve having a minimum opening equal to the difference in area between the portion 82 and the orifice 85, and a maximum flow area equal to the difference between the area of the portion 84 and the orifice 85. The seat member 85 is rigidly carried by a tubular member 86 secured to the frame 87 of the strut unit thereby providing an arrangement in which one portion of the valve is rigidly secured to vehicle frame and the other is secured for movement with the axle of the vehicle, in the manner generally illustrated in Figure 2.

Fluid under pressure is applied to the tube 86 via a conduit 22 and is directed to the air spring construction shown in Figure 3 via conduit 24. As the vehicle frame moves downwardly toward the member 14, to provide collapsed condition of the system, it will be clear that the yoke arm 78 will cause the piston 33a toward the right as viewed in Figure 4. This movement will cause the valve stem 82 to move toward the right, opening the metering valve to its maximum, thereby permitting an inrush of pressurized fluid from conduit 22 through the tube 86 and into the chamber 37a to move the piston 33a to the left and elevate the vehicle frame until the stem 82 moves toward the left a distance sufficient to block off the flow through the metering valve to the same extent as the restriction formed by the orifice 64 at the air spring. The operation of the device will thus be seen to be essentially identical to that above described relative to Figures 2 and 3.

In the form illustrated in Figure 4, the shock control valve 50 may be utilized satisfactorily for the same functions performed in connection with the strut 17 as shown in Figure 2. However, a supplemental, or substitute shock absorbing system may be provided in the embodiment shown in Figure 4, if desired. This may comprise, as shown in that figure, a shock absorber housing 88 rigidly carried by the housing 87 and telescoping the piston carrying tube 32a. A seal 89 is provided at the end of the shock absorber housing 88 and fluid is maintained in the shock absorber chamber 90 by means of the spring check valve 91. Under extreme conditions fluid may be relieved via the check valve 92 to bleed the fluid out of the chamber 90.

The piston carrying tube 32a is provided at its left hand end with a shock absorber piston 93 having an impact valve disk 94 supported by an impact spring 95. The flow in the rebound direction is controlled by valve disk 96 controlled by spring 97. The relative values of the springs 95 and 97 may, of course, be controlled as desired but it is preferred that the impact spring to be of less strength than the rebound spring 97 in most vehicle systems. It will be understood that the shock absorber system above described is independent of the continuous flow leveling system and may be supplied with fluid by filling the chamber 98 via a filling cap or conduit at 99. This shock absorber construction may of course, be utilized with or independently of the shock control valve 50. If it is to be used independently thereof and as a substitute for the valve 50, the plunger 52 and 53 may be eliminated entirely from the system. In view of the continuous flow nature of the modified strut form shown in Figure 4, it may be bodily substituted for the strut 17 in the system illustrated in Figure 1 to provide a satisfactory automatically leveling vehicle suspension.

Figure 5:
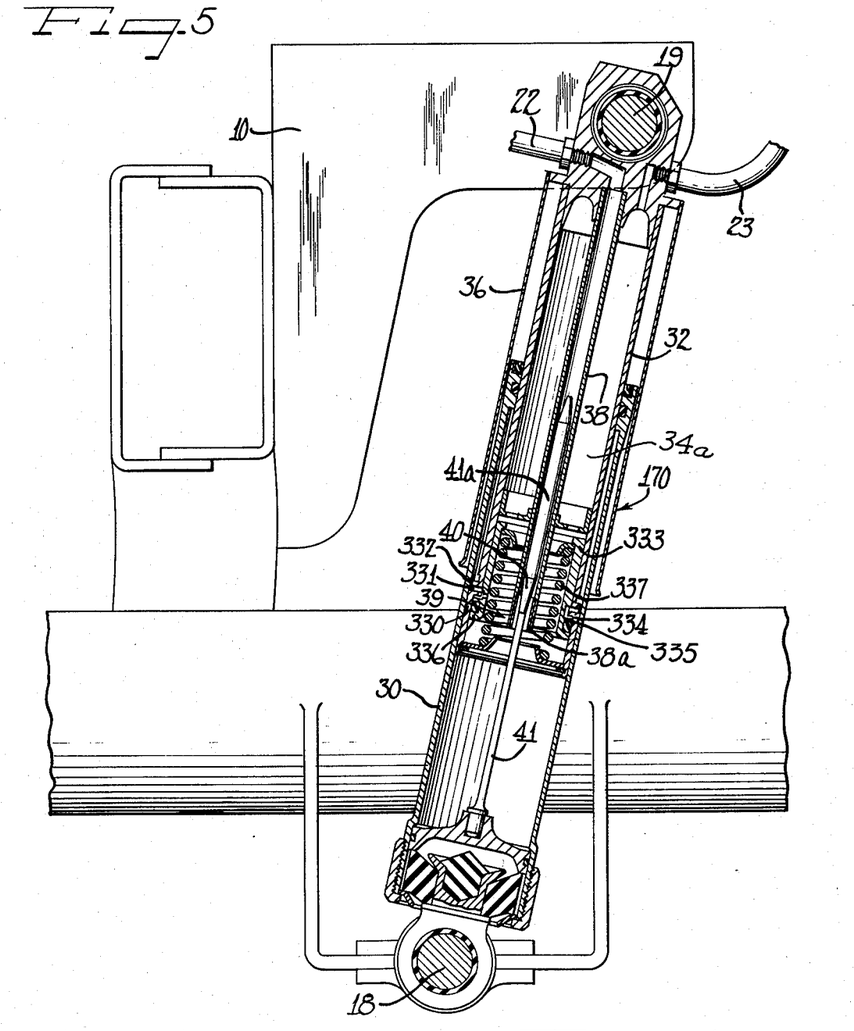

Still a further modified form of strut control is illustrated in Figure 5 wherein a strut generally indicated at 170 is illustrated. The strut 170 is substantially identical in outer appearance to the strut 17 and is provided with the same inlet conduit connection 22 and outlet conduit 23. Internally, the valve 39 is identical to the valve illustrated in Figure 2 and comprises a valve stem 41 having a tapered portion 40 and an enlarged, minimum orifice defining portion seat 38a carried by a valve housing 38 rigidly secured to a piston carrying tube 32 and dust shield 36 for connection at 19 to the vehicle frame.

The piston 330 carried by the supporting tube or housing 32 is, as may be seen, constructed with a radial fluid flow passage 331 leading to the reservoir 34a between the member 32 and the lower housing portion 30. As will be recalled from a consideration of Figure 2, the embodiment there shown did not provide for fluid entering the chamber 34 and instead maintained air therein. In the embodiment shown in Figure 5, however, fluid flows through an orifice 332 in a rebound control plunger 333, into an annular groove 334 in the rebound control plunger and thence through orifice 331 to the chamber 34a. This flow course is open during impact shocks in which the strut 170 tends to collapse. On the return, or rebound stroke, however, flow is permitted back through the passages 331, 332 and 334 only during gradual rebound movements. Upon a rapid movement, the rebound plunger 333 moves downwardly covering the orifice 331 partially and thereby preventing rapid re-extension of the strut.

The control by the plunger 333 is accomplished by limiting the diameter of the orifice 332 therein to a value smaller than the diameter of the orifice 331. By providing a small undercut lip 335 between the enlarged flange 336 of the plunger 333, a pressure build up in the annular groove 334 caused by the restriction in return flow at the orifice, 332, will move the plunger 333 against spring 337 to partially close off orifice 331 and substantially retard movement of the strut in the extending direction.

As in the case of the modified form shown in Figure 4, the rebound control illustrated in Figure 5 may be utilized in conjunction with the shock control valve 50, or independently thereof. As in the case of the preferred design of the control valve 50, the rebound resistance supplied by the orifices 331 and 332 is substantially greater than the resistance thereof to flow therethrough during impact, or forces tending to contract the strut.

It will thus be seen that I have provided a novel and unusually efficient automotive vehicle leveling system wherein an air spring serves to provide the resiliency for the suspension and hydraulic fluid provides simultaneously for leveling of the vehicle and transmitting motion of the frame thereof to the air spring. By continuous flow of the hydraulic fluid through the system, and the continuous leakdown that forms a part of this construction, overextension of the strut for any appreciable period of time is positively prevented. Additionally, an extremely important function is performed by continually circulating the hydraulic fluid. This is that the fluid is cooled as it passes through the conduits 22, 23, 24, and 26, thereby dissipating the heat that would otherwise be generated in the system. In an extremely heavy vehicle, such as trucks or the like, this heat may reach large proportions and the cooling effected by the continuous flow system herein above illustrated precludes breakdown from overheating. It will be understood that a heat exchanger may be inserted in the conduit 24, if desired, to conduct heat from the hydraulic fluid either to the surrounding atmosphere or to cooling water in the engine radiator.

While it has been found that the range of spring rates provided by a gas filled chamber such as the chamber 66 is adequate for ordinary vehicle operation under some conditions it may be desirable to increase or decrease the average spring rate. Thus, for example, while gas may be introduced into the chamber 66 by means of a valve 66a during initial assembly at a predetermined pressure which will provide a predetermined low spring rate when the vehicle is unloaded, it may be desired under certain circumstances to provide a still lower unloaded spring rate or, alternatively, a very high spring rate. A very high spring rate may be very desirable in situations where the automobile or other vehicle is to be extremely heavily loaded or, if the vehicle is to be used for racing purposes. In order to accomplish adjustment of the spring rate without requiring the addition or deletion of gas from the chamber 66, the chamber 66 is provided with an adjustable wall comprising a rubber or similar impervious panel 66b supported by a wall 66c adjusted by means of a jack screw 66d passing through a rigid support 66e and actuable by means of a wrench surface or the like 66f. Movement of the wall 66c toward the left as viewed in Figure 3 will provide an increased average spring rate and conversely movement of the wall 66c toward the right will provide a decreased average spring rate by varying the gas pressure applied against the diaphragm 68.

It will be apparent to those skilled in the art that variations and modifications in the above described construction may be accomplished without departing from the scope of the novel concepts of the present invention. Accordingly, it is my intention that the invention be limited solely by the scope of the hereinafter appended claims.

I claim as my invention:

1. A continuous flow automatic leveling system for vehicles having a frame member and at least one wheel member suspended therefrom comprising, an expandable hydraulic link supporting said frame member relative to said wheel member, means continuously introducing pressurized hydraulic fluid into said link to expand said link and lift said frame including valve means responsive to the relative position of said members to progressively increase the rate of introduction to a high value as said frame moves downwardly toward said wheel and to progressively decrease the rate of introduction to a low positive flow minimum value when said frame lifts upwardly away from said wheel, and means continuously relieving fluid from said link.

2. A continuous flow automatic leveling system for vehicles having a frame member and at least one wheel member suspended therefrom comprising, an expandable hydropneumatic member supporting said frame member relative to said wheel member, means continuously introducing pressurized hydraulic liquid into said member to expand said member and lift said frame including valve means responsive to the relative position of said members to progressively increase the rate of introduction to a high value as said frame moves downwardly toward said wheel and to progressively decrease the rate of introduction to a low positive flow minimum value when said frame lifts upwardly away from said wheel, and means continuously relieving fluid from said member, said last named means comprising a fluid-passing orifice permitting a rate of flow greater than said low value but less than said high value.

3. An automatically leveling suspension system for land vehicles having a frame member and a road supported wheel member comprising strut means connecting said wheel member to said frame member and comprising a piston connected to one of said members and a cylinder connected to the other of said members, said piston and cylinder defining a first expandable chamber, means for injecting pressurized fluid into said chamber to lift said frame relative to said wheel, means for reducing the rate of fluid injection to a predetermined positive flow minimum value when said frame and wheel reach a predetermined relative relationship, means connecting said chamber to a second resiliently expandable chamber whereby relative movement of said piston and cylinder will cause circulation of fluid between said first and second chambers under the influence of the resiliency of said second chamber to provide resilient low rate spring control between said frame and said wheel and means continuously metering fluid from at least one of said chambers to a low pressure sump thereby providing continuous flow of fluid through said chambers.

4. An automatically leveling suspension system for land vehicles having a frame member and a road supported wheel member comprising strut means connecting said wheel member to said frame member and comprising a piston connected to one of said members and a cylinder connected to the other of said members, said piston and cylinder defining a first expandable chamber, means for injecting pressurized fluid into said chamber to lift said frame relative to said wheel, means for reducing the rate of fluid injection to a predetermined positive flow minimum value when said frame and wheel reach a predetermined relative relationship, means connecting said chamber to a second resiliently expandable chamber whereby relative movement of said piston and cylinder will cause circulation of fluid between said first and second chambers under the influence of the resiliency of said second chamber to provide resilient spring-like control between said frame and said wheel, means continuously metering fluid from at least one of said chambers to a low pressure sump thereby providing continuous flow of fluid through said chambers, and means for cooling said continuously flowing fluid.

5. An automatically leveling suspension system for land vehicles having a frame member and a road supported wheel member comprising strut means connecting said wheel member to said frame member and comprising a piston connected to one of said members and a cylinder connected to the other of said members, said piston and cylinder defining a first expandable chamber, means for injecting pressurized fluid into said chamber to lift said frame relative to said wheel, means for reducing the rate of fluid injection to a predetermined minimum continuous flow value when said frame and wheel reach a predetermined relative relationship, means connecting said chamber to a second resiliently expandable chamber whereby relative movement of said piston and cylinder will cause circulation of fluid between said first and second chambers under the influence of the resiliency of said second chamber to provide resilient spring-like control between said frame and said wheel and means continuously metering fluid from at least one of said chambers to a low pressure sump thereby providing continuous flow of fluid through said chambers, said last named means comprising an aperture permitting fluid flow at a rate slightly greater than said reduced rate of fluid injection into said first chamber.

6. A resilient automatically leveling vehicle suspension for suspending a vehicle frame member relative to a road supported wheel member in a predetermined optimum level relation comprising, a hydraulic strut positioned between said members and having a first chamber expandable to raise said frame, a hydraulic pump for supplying fluid under pressure from a reservoir to said first chamber, conduit means leading from said first chamber to said reservoir, an orifice in said conduit for metering the flow back to said reservoir, a second spring chamber having a wall resiliently movable against a volume of compressed gas, means connecting said conduit to said second chamber upstream of said orifice whereby fluid will flow from said first chamber to said second chamber when a force is applied to lower the frame relative to said wheel and will return from said second chamber to said first chamber when said force is removed, and leveling valve means responsive to the relative position of said members to apply a progressively increasing flow of fluid from the pump to said first chamber as said frame moves downwardly below its optimum level and to apply a progressively decreasing flow to said first chamber when said frame moves upwardly above the optimum level.

7. A resilient automatically leveling vehicle suspension for suspending a vehicle frame member relative to a road supported wheel member in a predetermined optimum level relation comprising, a hydraulic strut positioned between said members and having a first chamber expandable to raise said frame, a hydraulic pump for supplying fluid under pressure from a reservoir to said first chamber, conduit means leading from said first chamber to said reservoir, an orifice in said conduit for metering the flow back to said reservoir, a second spring chamber having a wall resiliently movable against a volume of compressed gas, means connecting said conduit to said second chamber upstream of said orifice whereby fluid will flow from said first chamber to said second chamber when a force is applied to lower the frame relative to said wheel and will return from said second chamber to said first chamber when said force is removed, and leveling valve means responsive to the relative position of said members to apply a progressively increasing flow of fluid from the pump to said first chamber as said frame moves downwardly below its optimum level and to apply a progressively decreasing flow to said first chamber when said frames moves upwardly above the optimum level, the minimum flow applied by said valve comprising a positive circulating flow rate less than the rate permitted to pass through said orifice.

8. A resilient automatically leveling vehicle suspension for suspending a vehicle frame member relative to a road supported wheel member in a predetermined optimum level relation comprising, a hydraulic strut positioned between said members and having a first chamber expandable to raise said frame, a hydraulic pump for supplying fluid under pressure from a reservoir to said first chamber, conduit means leading from said first chamber to said reservoir, an orifice in said conduit for metering the flow back to said reservoir, a second spring chamber having a wall resiliently movable against a volume of compressed gas, means connecting said conduit to said second chamber upstream of said orifice whereby fluid will flow from said first chamber to said second chamber when a force is applied to lower the frame relative to said wheel and will return from said second chamber to said first chamber when said force is removed, leveling valve means responsive to the relative position of said members to apply a progressively increasing flow of fluid from the pump to said first chamber as said frame moves downwardly below its optimum level and to apply a progressively decreasing flow to said first chamber when said frame moves upwardly above the optimum level and means for blocking flow through said conduit except when the source of power for said pump is in operation.

9. A resilient automatically leveling vehicle suspension for suspending a vehicle frame member relative to a road supported wheel member in a predetermined optimum level relation comprising, a hydraulic strut positioned between said members and having a first chamber expandable to raise said frame, a hydraulic pump for supplying fluid under pressure from a reservoir to said first chamber, conduit means leading from said first chamber to said reservoir, an orifice in said conduit for metering the flow back to said reservoir, a second spring chamber having a wall resiliently movable against a volume of compressed gas, means connecting said conduit to said second chamber upstream of said orifice whereby fluid will flow from said first chamber to said second chamber when a force is applied to lower the frame relative to said wheel and will return from said second chamber to said first chamber when said force is removed, leveling valve means responsive to the relative position of said members to apply a progressively increasing flow of fluid from the pump to said first chamber as said frame moves downwardly below its optimum level and to apply a progressively decreasing flow to said first chamber when said frame moves upwardly above the optimum level and means for blocking flow through said conduit except when the source of power for said pump is in operation, said last named means being positioned between said orifice and said reservoir.

10. A resilient automatically leveling vehicle suspension for suspending a vehicle frame member relative to a road supported wheel member in a predetermined optimum level relation comprising, a hydraulic strut positioned between said members and having a first chamber expandable to raise said frame, a hydraulic pump for supplying fluid under pressure from a reservoir to said first chamber, conduit means leading from said first chamber to said reservoir, an orifice in said conduit for metering the flow back to said reservoir, a second spring chamber having a wall resiliently movable against a volume of compressed gas, means connecting said conduit to said second chamber upstream of said orifice whereby fluid will flow from said first chamber to said second chamber when a force is applied to lower the frame relative to said wheel and will return from said second chamber to said first chamber when said force is removed, leveling valve means responsive to the relative position of said members to apply a progressively increasing flow of fluid from the pump to said first chamber as said frame moves downwardly below its optimum level and to apply a progressively decreasing flow to said first chamber when said frame moves upwardly above the optimum level and means for blocking flow through said conduit except when the source of power for said pump is in operation, said last named means comprising a valve in said conduit normally resiliently biased into conduit blocking position and urged into open position by fluid under pressure from said pump.

11. A resilient automatically leveling vehicle suspension for suspending a vehicle frame member relative to a road supported wheel member in a predetermined optimum level relation comprising, a hydraulic strut positioned between said members and having a first chamber expandable to raise said frame, a hydraulic pump for supplying fluid under pressure from a reservoir to said first chamber, conduit means leading from said first chamber to said reservoir, an orifice in said conduit for metering the flow back to said reservoir, a second spring chamber having a wall resiliently movable against a volume of compressed gas, means connecting said conduit to said second chamber upstream of said orifice whereby fluid will flow from said first chamber to said second chamber when a force is applied to lower the frame relative to said wheel and will return from said second chamber to said first chamber when said force is removed, leveling valve means responsive to the relative position of said members to apply a progressively increasing flow of fluid from the pump to said first chamber as said frame moves downwardly below its optimum level and to apply a progressively decreasing flow to said first chamber when said frame moves upwardly above the optimum level and means for blocking flow through said conduit except when the source of power for said pump is in operation, said last named means comprising a valve in said conduit normally resiliently biased into conduit blocking position and urged into open position by fluid under pressure from said pump and check valve means between said pump and said first chamber to prevent flow from said chamber to said pump when said pump is developing no pressure.

12. A resilient automatically leveling vehicle suspension for suspending a vehicle frame member relative to a road supported wheel member in a predetermined optimum level relation comprising, a hydraulic strut positioned between said members and having a first chamber expandable to raise said frame, a hydraulic pump for supplying fluid under pressure from a reservoir to said first chamber, conduit means leading from said first chamber to said reservoir, an orifice in said conduit for metering the flow back to said reservoir, a second spring chamber having a wall resiliently movable against a volume of compressed gas, means connecting said conduit to said second chamber upstream of said orifice whereby fluid will flow from said first chamber to said second chamber when a force is applied to lower the frame relative to said wheel and will return from said second chamber to said first chamber when said force is removed, leveling valve means responsive to the relative position of said members to apply a progressively increasing flow of fluid from the pump to said first chamber as said frame moves downwardly below its optimum level and to apply a progressively decreasing flow to said first chamber when said frame moves upwardly above the optimum level, the minimum flow applied by said valve comprising a positive circulating flow rate less than the rate permitted to pass through said orifice, and damping means for retarding the rate of expansion or contraction of said first chamber.

13. A resilient automatically leveling vehicle suspension for suspending a vehicle frame member relative to a road supported wheel member in a predetermined optimum level relation comprising, a hydraulic strut positioned between said members and having a first chamber expandable to raise said frame, a hydraulic pump for supplying fluid under pressure from a reservoir to said first chamber, conduit means leading from said first chamber to said reservoir, an orifice in said conduit for metering the flow back to said reservoir, a second spring chamber having a wall resiliently movable against a volume of compressed gas, means connecting said conduit to said second chamber upstream of said orifice whereby fluid will flow from said first chamber to said second chamber when a force is applied to lower the frame relative to said wheel and will return from said second chamber to said first chamber when said force is removed, leveling valve means responsive to the relative position of said members to apply a progressively increasing flow of fluid from the pump to said first chamber as said frame moves downwardly below its optimum level and to apply a progressively decreasing flow to said first chamber when said frame moves upwardly above the optimum level, the minimum flow applied by said valve comprising a positive circulating flow rate less than the rate permitted to pass through said orifice, and damping means for retarding the rate of expansion or contraction of said first chamber, said damping means comprising an orifice positioned in said conduit between said first and second chambers for limiting the rate of flow back and forth between said chambers.

14. A resilient automatically leveling vehicle suspension for suspending a vehicle frame member relative to a road supported wheel member in a predetermined optimum level relation comprising, a hydraulic strut positioned between said members and having a first chamber expandable to raise said frame, a hydraulic pump for supplying fluid under pressure from a reservoir to said first chamber, conduit means leading from said first chamber to said reservoir, an orifice in said conduit for metering the flow back to said reservoir, a second spring chamber having a wall resiliently movable against a volume of compressed gas, means connecting said conduit to said second chamber upstream of said orifice whereby fluid will flow from said first chamber to said second chamber when a force is applied to lower the frame relative to said wheel and will return from said second chamber to said first chamber when said force is removed, leveling valve means responsive to the relative position of said members to apply a progressively increasing flow of fluid from the pump to said first chamber as said frame moves downwardly below its optimum level and to apply a progressively decreasing flow to said first chamber when said frame moves upwardly above the optimum level, the minimum flow applied by said valve comprising a positive circulating flow rate less than the rate permitted to pass through said orifice, and damping means for retarding the rate of expansion or contraction of said first chamber, said damping means comprising an orifice positioned in said conduit between said first and second chambers for limiting the rate of flow back and forth between said chambers, said orifice providing a minimum flow rate greater than the maximum flow permitted by said leveling valve.

15. A resilient automatically leveling vehicle suspension for suspending a vehicle frame member relative to a road supported wheel member in a predetermined optimum level relation comprising, a hydraulic strut positioned between said members and having a first chamber expandable to raise said frame, a hydraulic pump for supplying fluid under pressure from a reservoir to said first chamber, conduit means leading from said first chamber to said reservoir, an orifice in said conduit for metering the flow back to said reservoir, a second spring chamber having a wall resiliently movable against a volume of compressed gas, means connecting said conduit to said second chamber upstream of said orifice whereby fluid will flow from said first chamber to said second chamber when a force is applied to lower the frame relative to said wheel and will return from said second chamber to said first chamber when said force is removed, leveling valve means responsive to the relative position of said members to apply a progressively increasing flow of fluid from the pump to said first chamber as said frame moves downwardly below its optimum level and to apply a progressively decreasing flow to said first chamber when said frame moves upwardly above the optimum level, the minimum flow applied by said valve comprising a positive circulating flow rate less than the rate permitted to pass through said orifice, and damping means for retarding the rate of expansion or contraction of said first chamber, said damping means comprising a dashpot operatively connected between said frame and said wheel and within said strut.

16. An automatically leveling suspension system for land vehicles having a frame member and a road supported wheel member comprising strut means connecting said wheel member to said frame member and comprising a piston connected to one of said members and a cylinder connected to the other of said members, said piston and cylinder defining a first expandable chamber, means for injecting pressurized fluid into said chamber to lift said frame relative to said wheel, means for reducing the rate of fluid injection to a predetermined minimum value when said frame and wheel reach a predetermined desired relative relationship, means connecting said chamber to a second resiliently expandable chamber whereby relative movement of said piston and cylinder will cause circulation of fluid between said first and second chambers under the influence of the resiliency of said second chamber to provide resilient spring-like control between said frame and said wheel, means continuously metering fluid from at least one of said chambers to a low pressure sump at a rate slightly greater than said reduced rate of fluid injection into said first chamber, and damping means for retarding the expansion and contraction of said chamber, said damping means comprising a dashpot secured between said piston and said cylinder.

17. An automatically leveling suspension system for land vehicles having a frame member and a road supported wheel member comprising strut means connecting said wheel member to said frame member and comprising a piston connected to one of said members and a cylinder connected to the other of said members, said piston and cylinder defining a first expandable chamber, means for injecting pressurized fluid into said chamber to lift said frame relative to said wheel, means for reducing the rate of fluid injection to a predetermined minimum value when said frame and wheel reach a predetermined desired relative relationship, means connecting said chamber to a second resiliently expandable chamber whereby relative movement of said piston and cylinder will cause circulation of fluid between said first and second chambers under the influence of the resiliency of said second chamber to provide resilient spring-like control between said frame and said wheel, means continuously metering fluid from at least one of said chambers to a low pressure sump at a rate slightly greater than said reduced rate of fluid injection into said first chamber, and damping means for retarding the expansion and contraction of said chamber, said damping means comprising a restricted orifice between said chambers, said orifice having a dimension sufficient to pass fluid at a greater rate than said maximum rate of fluid injection into said first chamber.

18. An automatically leveling suspension system for land vehicles having a frame member and a road supported wheel member comprising strut means connecting said wheel member to said frame member and comprising a piston connected to one of said members and a cylinder connected to the other of said members, said piston and cylinder defining a first expandable chamber, means for injecting pressurized fluid into said chamber to lift said frame relative to said wheel, means for reducing the rate of fluid injection to a predetermined minimum value when said frame and wheel reach a predetermined desired relative relationship, means connecting said chamber to a second resiliently expandable chamber whereby relative movement of said piston and cylinder will cause circulation of fluid between said first and second chambers under the influence of the resiliency of said second chamber to provide resilient spring-like control between said frame and said wheel, means continuously metering fluid from at least one of said chambers to a low pressure sump at a rate slightly greater than said reduced rate of fluid injection into said first chamber, and damping means for retarding the expansion and contraction of said chamber, said damping means comprising a restricted orifice between said chambers, said orifice having a dimension sufficient to pass fluid at a greater rate than said maximum rate of fluid injection into said first chamber, and an additional relief orifice in said damping means operable to pass fluid at a rapid rate under extremely high fluid pressure conditions in said first chamber relative to said second chamber.

19. An automatically leveling suspension system for land vehicles having a frame member and a road supported wheel member comprising strut means connecting said wheel member to said frame member and comprising a piston connected to one of said members and a cylinder connected to the other of said members, said piston and cylinder defining a first expandable chamber, means for injecting pressurized fluid into said chamber to lift said frame relative to said wheel, means for reducing the rate of fluid injection to a predetermined minimum value when said frame and wheel reach a predetermined desired relative relationship, means connecting said chamber to a second resiliently expandable chamber whereby relative movement of said piston and cylinder will cause circulation of fluid between said first and second chambers under the influence of the resiliency of said second chamber to provide resilient spring-like control between said frame and said wheel, means continuously metering fluid from at least one of said chambers to a low pressure sump thereby providing continuous flow of fluid through said chambers, said second chamber having a wall thereof resiliently supported by a volume of gas under pressure, and means for adjusting the pressure of said gas without varying the quantity thereof.

20. A continuous flow automatic leveling system for vehicles having a frame member and at least one wheel member suspended therefrom comprising, a resiliently expandable hydraulic member supporting said frame member relative to said wheel member, means continuously introducing pressurized hydraulic fluid into said member to expand said member and lift said frame including valve means responsive to the relative position of said members to progressively increase the rate of introduction to a high value as said frame moves downwardly toward said wheel and to progressively decrease the rate of introduction to a low positive flow minimum value when said frame lifts upwardly away from said wheel, and means continuously relieving fluid from said member.

21. A resilient automatically leveling vehicle suspension for suspending a vehicle frame member relative to a road supported wheel member in a predetermined optimum level relation comprising, a hydraulic strut positioned between said members and having a first chamber expandable to raise said frame, a hydraulic pump for supplying fluid under pressure from a reservoir to said first chamber, conduit means leading from said first chamber to said reservoir, an orifice in said conduit for metering the flow back to said reservoir, a second spring chamber having a wall resiliently movable against a volume of compressed gas, means connecting said first chamber to said second chamber upstream of said orifice whereby fluid will flow from said first chamber to said second chamber when a force is applied to lower the frame relative to said wheel and will return from said second chamber to said first chamber when said force is removed, and leveling valve means responsive to the relative position of said members to apply a progressively increasing flow of fluid from the pump to said first chamber as said frame moves downwardly below its optimum level and to apply a progressively decreasing flow to said first chamber when said frame moves upwardly above the optimum level.

22. A resilient automatically leveling vehicle suspension for suspending a vehicle frame member relative to a road supported wheel member in a predetermined optimum level relation comprising, a hydraulic strut positioned between said members and having a first chamber expandable to raise said frame, a hydraulic pump for supplying fluid under pressure from a reservoir to said first chamber, conduit means leading from said first chamber to said reservoir, an orifice in said conduit for metering the flow back to said reservoir, a second spring chamber having a wall resiliently movable against a volume of compressed gas, means connecting said first chamber to said second chamber upstream of said orifice whereby fluid will flow from said first chamber to said second chamber when a force is applied to lower the frame relative to said wheel and will return from said second chamber to said first chamber when said force is removed, leveling valve means responsive to the relative position of said members to apply a progressively increasing flow of fluid from the pump to said first chamber as said frame moves downwardly below its optimum level and to apply a progressively decreasing flow to said first chamber when said frame moves upwardly above the optimum level, the minimum flow applied by said valve comprising a positive circulating flow rate less than the rate permitted to pass through said orifice, and damping means for retarding the rate of expansion or contraction of said first chamber.

References Cited in the file of this patent

UNITED STATES PATENTS

| | | |
|---|---|---|
| 1,861,821 | Schaum | June 7, 1932 |
| 2,406,304 | Levy | Aug. 20, 1946 |
| 2,490,311 | Rostu | Dec. 6, 1949 |
| 2,543,455 | Goepfrich | Feb. 27, 1951 |
| 2,591,090 | Newman | Apr. 1, 1952 |
| 2,644,699 | Weiertz | July 7, 1953 |
| 2,687,311 | Nallinger | Aug. 24, 1954 |
| 2,756,046 | Lucien | July 24, 1956 |